(12) United States Patent
Chourey et al.

(10) Patent No.: US 11,021,032 B2
(45) Date of Patent: Jun. 1, 2021

(54) BOGIE BALANCING SYSTEM AND METHOD FOR A WORK MACHINE

(71) Applicant: DEERE & COMPANY, Moline, IL (US)

(72) Inventors: Rahul Chourey, Nasik (IN); Bryon P. Neumann, Ontario (CA); Adam J. Eisbach, East Dubuque, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/391,969

(22) Filed: Apr. 23, 2019

(65) Prior Publication Data

US 2020/0338947 A1 Oct. 29, 2020

(51) Int. Cl.
*B60G 17/016* (2006.01)
*B60G 7/00* (2006.01)
(Continued)

(52) U.S. Cl.
CPC .......... *B60G 17/0161* (2013.01); *B60G 5/02* (2013.01); *B60G 7/001* (2013.01); *B60G 17/017* (2013.01); *B60G 17/0162* (2013.01); *B60G 17/0165* (2013.01); *B60G 17/01908* (2013.01); *B60G 21/023* (2013.01); *B60G 21/045* (2013.01);
(Continued)

(58) Field of Classification Search
CPC .. B60G 17/0161; B60G 21/023; B60G 7/001; B60G 17/0165; B60G 21/045; B60G 17/0162; B60G 17/01908; B60G 17/017; B60G 5/02; B60G 2400/204; B60G 2600/18; B60G 2500/30; B60G 2206/0112; B60G 2600/20; B60G 2600/21; B60G 2800/205; B60G 2400/63; B60G 2400/0511; B60G 2800/914; B60G 2800/214; B60G 2400/821;
(Continued)

(56) References Cited

U.S. PATENT DOCUMENTS 4,056,158 A * 11/1977 Ross .................... B60G 17/033
180/6.48
4,462,477 A 7/1984 Mastro
(Continued)

FOREIGN PATENT DOCUMENTS

DE 202016102709 U1 7/2016
EP 1203676 A1 5/2002
(Continued)

*Primary Examiner* — Drew J Brown (57) ABSTRACT

A bogie positioning system and method for a work machine. The bogie positioning system adapted to selectively engage a wheel of a work machine to a ground surface through a bogie assembly wherein the bogie assembly may have a front wheel coupled to a rear wheel through a bogie coupling mechanism. The bogie coupling mechanism comprising a beam with a rotary joint. The rotary joint allowing the front wheel to rotate about a rotary axis relative to the rear wheel. The beam is coupled to a chassis of the work machine with at least one actuator coupled to the beam. A control unit is in communication with the bogie assembly, a user input interface, and a plurality of sensors, generating command signals to actuate the actuator based on the input signals, thereby selectively engaging the front wheel or the rear wheel with the ground surface.

20 Claims, 10 Drawing Sheets

(51) Int. Cl.
  *B60G 17/0165* (2006.01)
  *B60G 17/017* (2006.01)
  *B60G 17/019* (2006.01)
  *B60G 21/045* (2006.01)
  *B60G 21/02* (2006.01)
  *B60G 5/02* (2006.01)

(52) U.S. Cl.
  CPC .......... *B60G 2206/0112* (2013.01); *B60G 2400/0511* (2013.01); *B60G 2400/0512* (2013.01); *B60G 2400/204* (2013.01); *B60G 2400/41* (2013.01); *B60G 2400/52* (2013.01); *B60G 2400/63* (2013.01); *B60G 2400/821* (2013.01); *B60G 2400/823* (2013.01); *B60G 2500/30* (2013.01); *B60G 2600/18* (2013.01); *B60G 2600/20* (2013.01); *B60G 2600/21* (2013.01); *B60G 2800/205* (2013.01); *B60G 2800/214* (2013.01); *B60G 2800/914* (2013.01)

(58) Field of Classification Search
  CPC .......... B60G 2400/52; B60G 2400/823; B60G 2400/0512; B60G 2400/41
  See application file for complete search history.

(56) References Cited

U.S. PATENT DOCUMENTS

| | | | |
|---|---|---|---|
| 4,572,311 A | 2/1986 | Oswald et al. | |
| 4,842,302 A | 6/1989 | Lauronen et al. | |
| 4,861,065 A * | 8/1989 | Cote | B60G 5/02 280/6.154 |
| 4,872,700 A | 10/1989 | Mellgren | |
| 5,339,611 A * | 8/1994 | Roderfeld | B60G 5/00 180/209 |
| 6,247,196 B1 * | 6/2001 | Jurmu | B60G 5/02 280/81.6 |
| 7,770,909 B2 | 8/2010 | Anderson et al. | |
| 7,950,675 B1 * | 5/2011 | Quenzi | B60P 1/027 280/6.157 |
| 8,016,068 B2 * | 9/2011 | Daniel | B60G 5/02 180/306 |
| 9,055,719 B2 | 6/2015 | Bowman et al. | |
| 9,121,143 B2 * | 9/2015 | Hagen | E01C 19/48 |
| 9,783,959 B2 | 10/2017 | Schifferer et al. | |
| 2008/0035439 A1 | 2/2008 | Fox | |
| 2008/0269986 A1 * | 10/2008 | Regnell | B60G 17/0523 701/37 |
| 2011/0040460 A1 | 2/2011 | Velde et al. | |
| 2013/0264801 A1 * | 10/2013 | Solbrack | B60G 17/017 280/683 |
| 2017/0129299 A1 | 5/2017 | Andreasson et al. | |
| 2018/0251123 A1 * | 9/2018 | Sigmar | B60G 15/02 |
| 2019/0329617 A1 * | 10/2019 | T Dne | B60G 5/02 |
| 2020/0215866 A1 * | 7/2020 | Hoter Ishay | B60G 5/06 |

FOREIGN PATENT DOCUMENTS

| | | |
|---|---|---|
| SU | 1199885 A1 | 12/1985 |
| WO | 9845132 A1 | 10/1998 |
| WO | 2012123630 A1 | 9/2012 |

* cited by examiner

BOGIE BALANCING SYSTEM AND METHOD FOR A WORK MACHINE

CROSS-REFERENCE TO RELATED APPLICATIONS

N/A

FIELD OF THE DISCLOSURE

The present disclosure relates to a system and method for balancing a bogie, particularly a bogie comprising a beam coupled to a chassis of a vehicle with a rotary joint, the beam coupled to a front wheel and a rear wheel.

BACKGROUND

Forestry work machines and other work machines generally traverse uneven terrain with varying soil conditions. These work machines are often equipped with driving gears to improve their off-road performance and to stabilize their steering. The driving gears are mounted on the chassis of the vehicle transmitting the propulsion force to the work while using bogies coupled to the chassis. The bogies are normally equipped with a passive dampening mechanism for softening the harmful effects of rough terrain caused by the drive of the wheels on such terrain. One of the problems in use of a passive bogie system is limited means of control presented by such an apparatus. Therein lies a need to address issues with traction between the wheels and the ground surface, instability, uneven distribution of weight, and overloading resulting in possible damage of the propulsion system.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The bogie positioning system for a work machine is adapted to selectively engage a wheel of a work machine to the ground surface. The system may comprise of a left bogie assembly and a right bogie assembly. Each respective bogie assembly may have a front wheel of the work machine coupled to a rear wheel of the work machine through a bogie coupling mechanism. The bogie coupling mechanism may comprise a beam with a rotary joint wherein the rotary joint allows the front wheel to rotate about a rotary axis relative to the rear wheel. The beam may be coupled to the chassis of the work machine with at least one actuator coupled to the beam. The actuator may rotate the beam about the rotary axis where actuation of the actuator positions the front wheel or the rear wheel at a predetermined vertical displacement relative to the chassis. A control unit in communication with the bogie assemblies, a user input interface and a plurality of sensors, may generate command signals to actuate the actuator based on input signal from either the user input interface or the plurality of sensors. The command signals selectively engage at least one of the front wheel and the rear wheel of the work machine to the ground surface.

According to another aspect of the bogie positioning system, the control unit may comprise a speed module. The speed module may be configured to receive a speed input signal based on either a work machine speed or gear selection to transmit a command signal. The command signal may vertically position a first wheel of the right bogie assembly and a corresponding second wheel of the left bogie assembly based on the speed input signals.

Furthermore, the user input interface may comprise a roading mode switch, wherein activating the roading mode switch generates a roading mode input signal. The control unit may transmit a command signal in response to the roading mode input signal to vertically raise a front wheel or rear wheel of the right bogie assembly and a corresponding front wheel or rear wheel of the left bogie assembly to at least partially disengage the ground surface.

According to another aspect, the control unit may comprise an object detection module. The user input interface may also comprise a repair mode switch corresponding to the repair mode of the work machine. Activating the repair mode may generate a repair mode input signal wherein the control unit transmits a command signal in response to the repair mode input signal to raise at least one of the front wheel and the rear wheel to disengage the ground surface. The object detection module may receive an object detection input signal based on detection of an object in a path of travel of the work the work machine from the plurality of sensors. The object detection module may then transmit a command signal in response to the object detection input signal to raise a front wheel or a rear wheel closest to the direction of travel.

In addition, the control unit may comprise an articulation angle module wherein the articulation angle module receives an articulation angle input signal representing the articulation angle at a hitch from the plurality of sensors. The articulation angle module may determine when the articulation angle is greater than a predetermined angle. The articulation angle may transmit a command signal in response to the articulation input signal to disengage the rear wheel with the ground surface.

The control unit may comprise a tire pressure module wherein the tire pressure module may receive a tire input signal representing a tire pressure of each respective wheel from the plurality of sensors. The tire pressure module may then transmit a command signal in response to the tire pressure input signal to shift a center of mass of the chassis by vertically displacing at least one of the front wheel and the rear wheel.

In addition, the control unit may comprise an inclination module. The inclination module may generate an inclination angle input signal representing one or more of a roll and a pitch of the chassis from the plurality of sensors. The inclination module may transmit a command signal in response to the inclination angle input signal to shift a center of mass of the chassis by vertically displacing at least one of the front wheel and rear wheel.

According to another aspect, the control unit may comprise a ride control module. The ride control module may receive a ride control input signal representing a load position of an implement from the plurality of sensors. The ride control module may transmit a command signal in response to the ride control input signal to shift a center of mass of the chassis by vertically displacing at least one of the front wheel or the rear wheel.

The control unit may comprise a differential slip module. The differential slip module receiving a traction input signal from each respective wheel from the plurality of sensors. The differential slip module may then transmit a command signal in response to the traction input signal to equalize the torque load on a propulsion system by vertically displacing at least one of the front wheel and the rear wheel.

Additionally, the disclosure encompasses a method of selectively engaging at least one wheel of a bogie assembly of a work machine to the ground surface. The method may include receiving input signals by a control unit on the work machine from at least one of a user input interface located on the work machine and a plurality of sensors located on the work machine, determining a condition by the control unit based on the input signals, programming a command signal based on the condition, transmitting the command signal to the at least one actuator of the bogie assembly, and actuating at least one actuator of the bogie assembly, wherein actuation of at least one actuator positions either the front wheel or the rear wheel at a predetermined vertical displacement relative to the chassis.

Like the system, the method comprises the same modules and switches from the user input interface as the apparatus.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
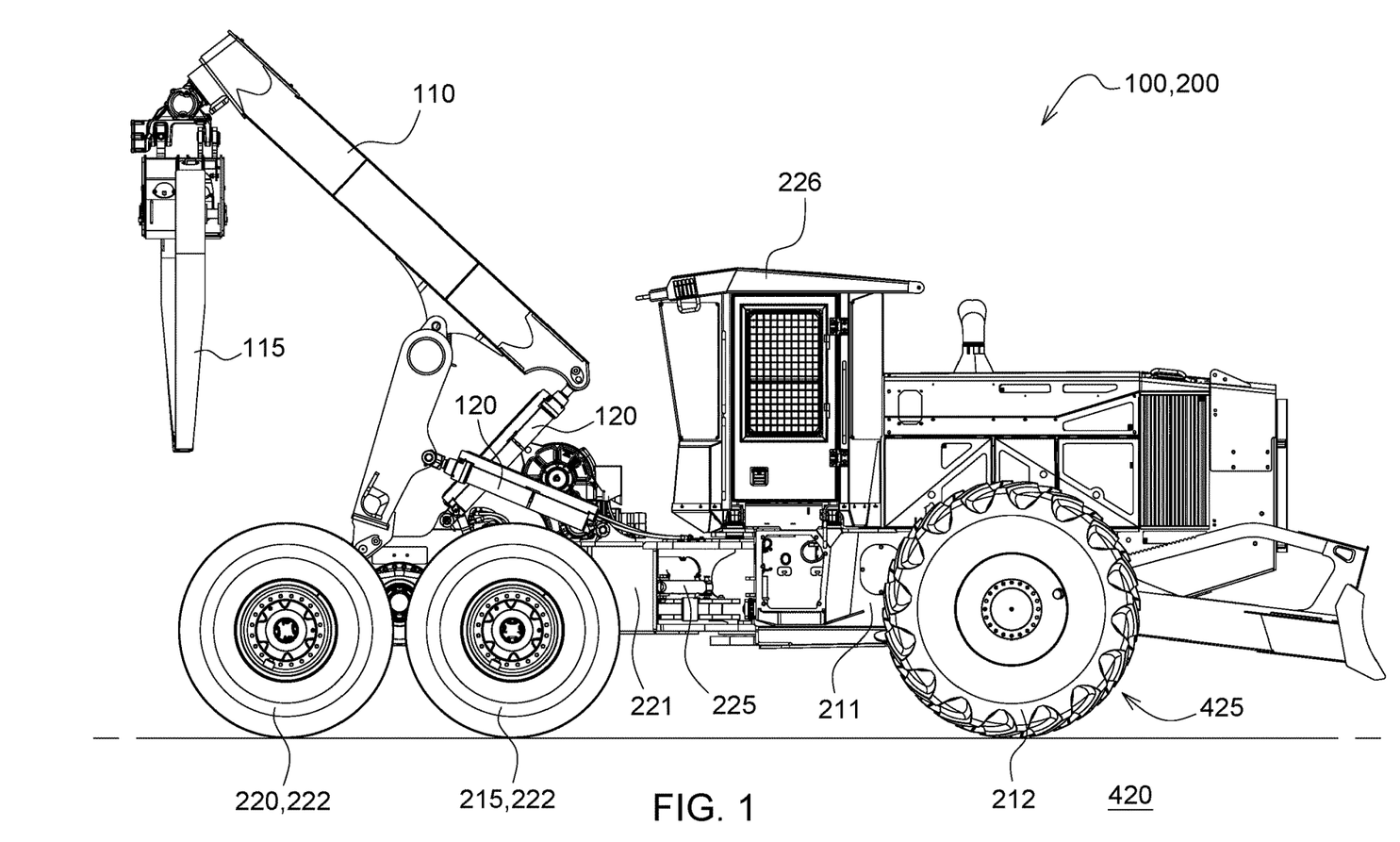
FIG. 1 is a side view of an exemplary embodiment of a work machine having a bogie.
Figure 2:
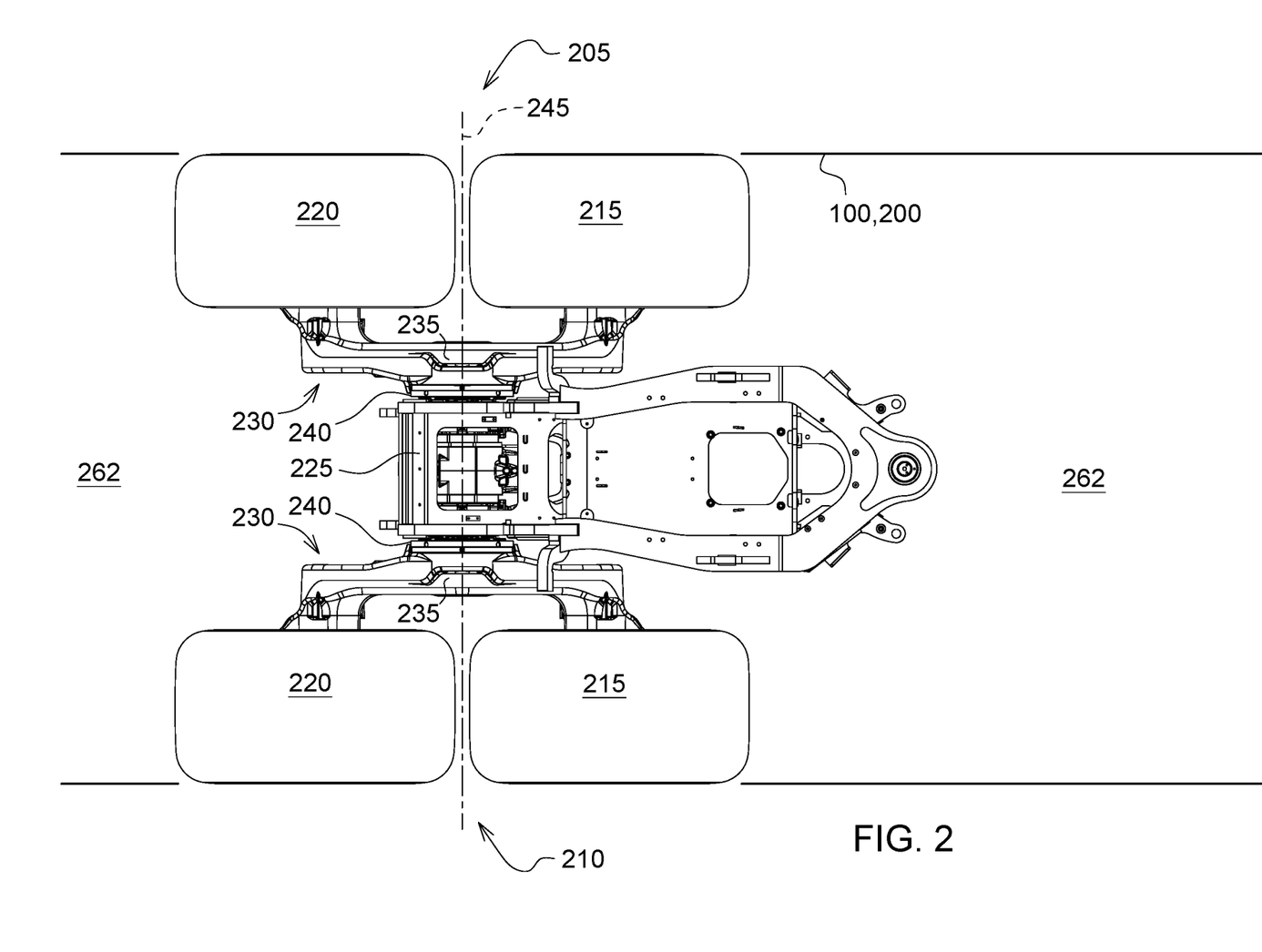
FIG. 2 is a schematic top view of the rear portion of the exemplary embodiment found in FIG. 1.

Now referring to FIGS. 1 and 2, the skidder 200 having a bogie positioning system 600 adapted to selectively engage a wheel of a work machine 100 is shown. The skidder 200 may be used to transport harvested trees over natural grounds such as a forest. Please note that while the figures and descriptions may relate to a six-wheeled skidder in this first exemplary embodiment, it is to be understood that the scope of the present disclosure extends beyond a six-wheeled skidder as noted above and may include a four-wheeled skidder, or some other vehicle, and the term "work machine" or "vehicle" may also be used. The term "work machine" is intended to be broader and encompass other work machines besides a skidder 200. Other applicable work machines having a bogie positioning system 600 may be configured as harvesters, diggers, forwarders, loaders, feller bunchers, concrete crushers and other work machines with a bogie.

A control unit 615 (shown in FIG. 6) may be in communication with a front vehicle frame 211 coupled to a rear vehicle frame 221. Generally, a front vehicle frame 211 and a rear vehicle frame 221 may be referred to herein as chassis, 225. First wheels 212 support the front vehicle frame 211, and the front vehicle frame 211 supports an engine compartment 224 and operator cab 226. Second wheels 222 support the rear vehicle frame 221, and the rear vehicle frame 221 supports a boom assembly 110. Although the ground-engaging mechanism is described as wheels in this embodiment, in an alternative embodiment, tracks or combination of wheels and tracks may be used. The engine compartment 224 houses a propulsion system, such as a diesel engine or motor which provides the motive power for driving the first and second wheels (212, 222) and for operating the other components associated with the skidder 200 such as the actuators (120, 250) to move the boom assembly 110 or move a bogie assembly (205, 210). The operator cab 226, where an operator sits when operating the work machine 100, includes a user input interface 603 with a plurality of controls (e.g. switches, joysticks, pedals, buttons, levers, display screens, etc.) for controlling the work machine 100 during operation thereof. The control unit 180 may comprise several modules 607 (shown in FIG. 6) communicatively coupled with the controllable subsystems 635 (shown in FIG. 6) of the work machine 100, through a CAN bus 617 (shown in FIG. 6), which will be discussed in more detail below.

FIG. 2 is a schematic top view of a portion of the work machine 100, or more specifically the rear vehicle frame 221 found in the exemplary embodiment in FIG. 1 on a path of travel 262. The skidder 200 includes a chassis 225 with a left bogie assembly 205 and a right bogie assembly 210. Each respective bogie assembly (205, 210) includes a front wheel 215 of the work machine 100 coupled to a rear wheel 220 of the work machine 100 through a bogie coupling mechanism 230. This bogie coupling mechanism 230 comprises a beam 235 with a rotary joint 240. The rotary joint 240 allows the front wheel 215 to rotate about a rotary axis 245 relative to the rear wheel 220. The beam 235 may be coupled to the chassis 225 of the work machine 100, wherein at least one actuator 250 is coupled to the beam 235. The at least one actuator 250 (shown in FIG. 6) may rotate the beam 235 about the rotary axis 245 wherein actuation of the at least one actuator 250 positions at least one of the front wheel 215 and the rear wheel 220 at a predetermined vertical displacement 412 (shown in FIGS. 4B and 5) relative to the chassis 225. On the other hand, the angularity of the individual bogie beams 235 can be controlled by at least one actuator 250.

A predetermined vertical displacement 412 may comprise of a definitive value or an approximate value to achieve a desired result. The predetermined vertical displacement 412 is using the work machine 100 in active control status 622 (as opposed to passive control status 624) and may change dynamically based on a feedback mechanism through a constant stream of input signals 630. The approximate value may also be derived from a stored look up table 632, or alternatively only be derived from feedback from the real-time input signals.

Figure 3:
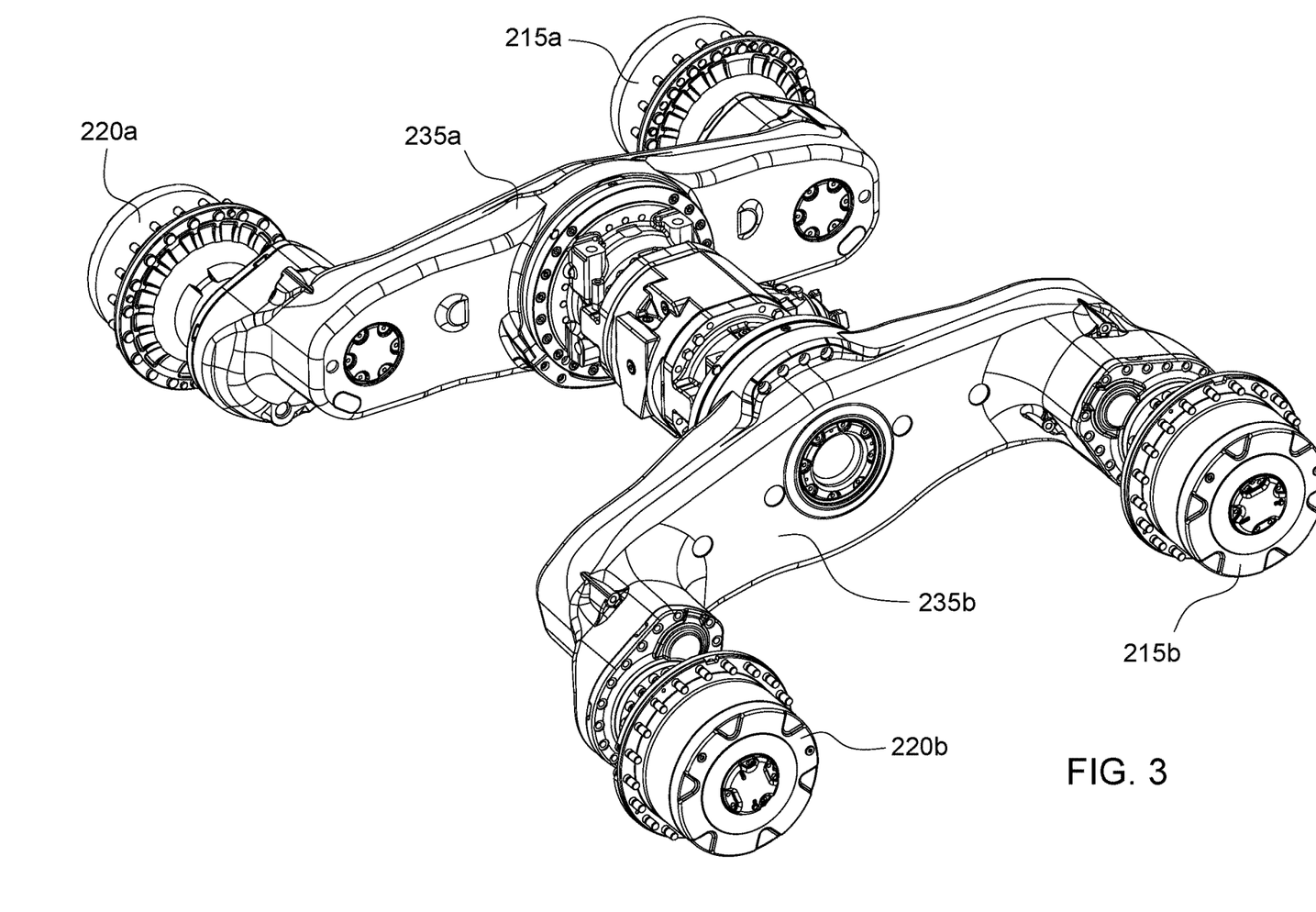
FIG. 3 is an isometric view of an exemplary right and left bogie assemblies.
Figure 4A:
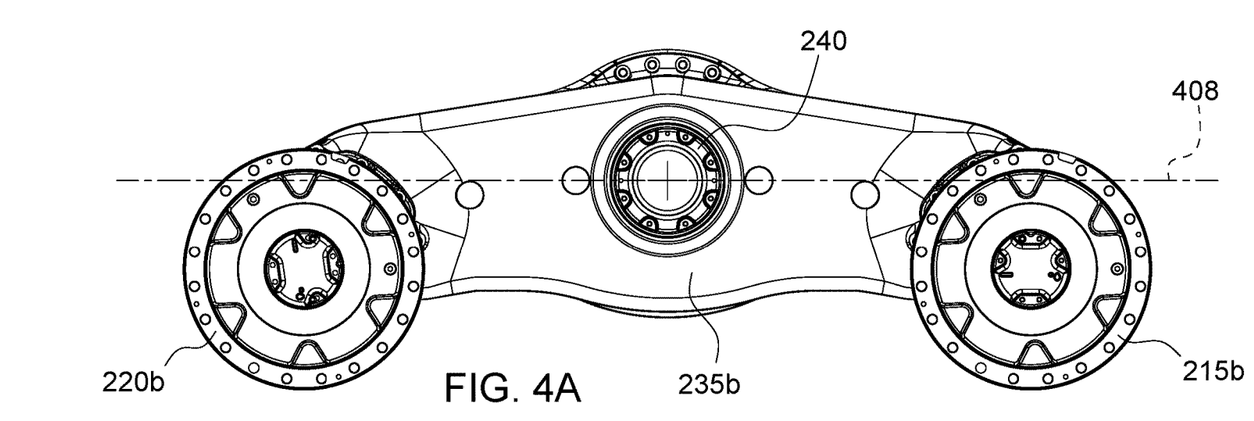
FIG. 4A is a side view of FIG. 3 with the right and left bogie assemblies at the horizontal.
Figure 4B:
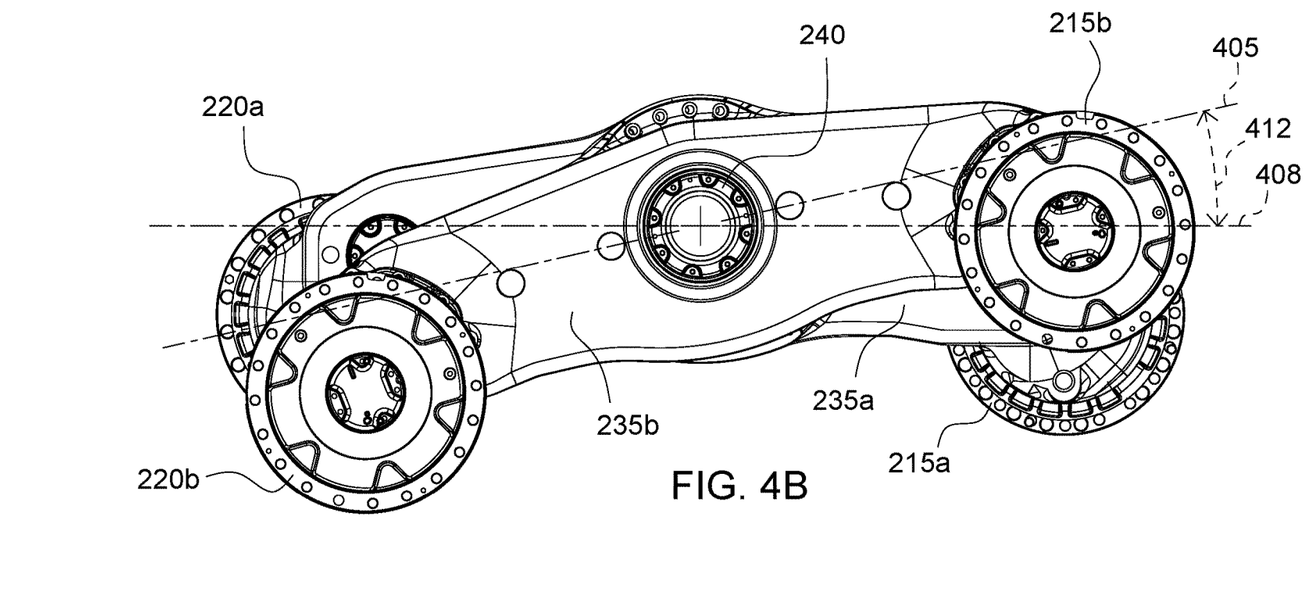
FIG. 4B is a side view of FIG. 3 with the right bogie assembly rotated out of the horizontal.
Figure 6:
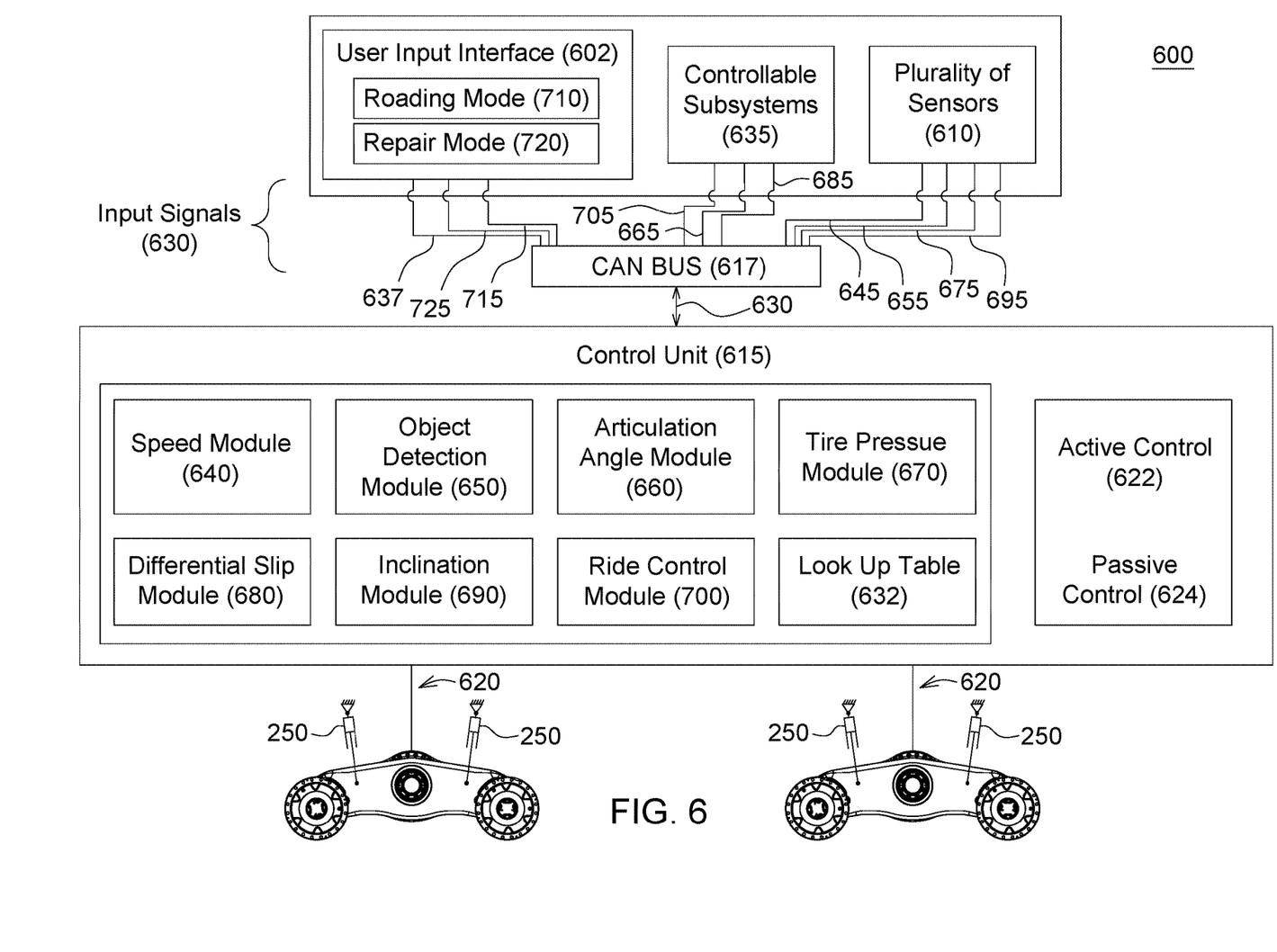
FIG. 6 is a schematic of the bogie positioning system.

FIG. 6, and referring to FIGS. 4a and 4b show double acting hydraulic actuators 250 whereby their extension and retraction may cause the beam 235 to rotate about the rotary joint 240 coupled to the chassis 225. Please note that components marked alphanumeric labels identify a first and second of the same component. In the embodiment shown in FIGS. 3, 4a, and 4b numerals ending in "a" refer to the left side and numerals ending in "b" refer to the right side. The at least one actuator 250 may function in passive control status 624 wherein the at least one actuator passively responds to provide a dampening effect for irregularities encountered on the ground surface 420, or alternatively actively respond either by input signals 630 from the operator from the user input interface 603, a conditional response, input signals 630 from a plurality of sensors 610 located on the work machine 100 to optimize driving maneuverability and function.

Figure 5:
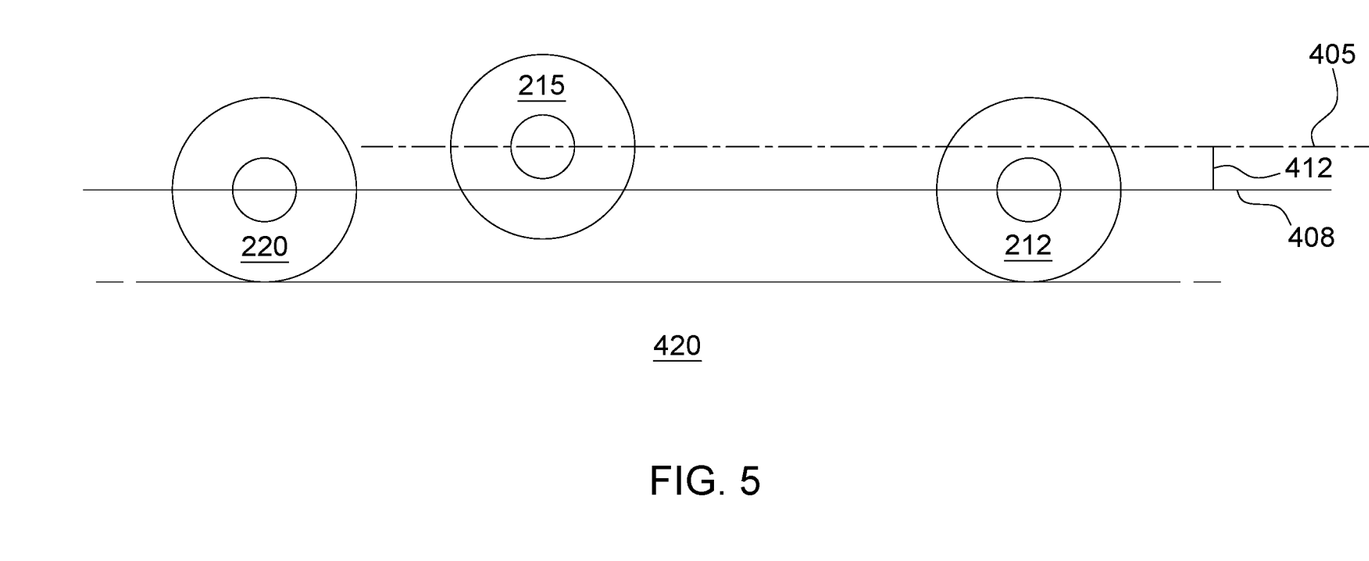
FIG. 5 is a simplified schematic of the wheels positioned relative to one another for the embodiment in FIG. 1 when a bogie assembly rotates a wheel out of the horizontal.

FIGS. 3, 4A, and 4B is an exemplary embodiment of a left and right bogie assembly by NAF Axles in Germany, one of several embodiments that may be used with the bogie positioning system 600. As shown in FIGS. 3, 4A, 4B, and 5, the left bogie beam 235a and the right bogie beam 235b oscillate independently of one another, allowing for example the right front wheel 215b to freely take a position of vertical displacement 412 upwards when the beam rotates out of the horizontal 408 (e.g. into a broken line position 405 to accommodate an obstacle, such as a large bump). In another scenario, a wheel (220a, 220b, 215a, 215b) may be actively rotated out of the horizontal 408 upwards and held stationary in place to accommodate repair of a tire, for example. These and other exemplary applications will be discussed in more detail below. FIG. 5 demonstrates a simplified schematic of wheels positioned relative to one another when a bogie assembly (205, 210) rotates out of the horizontal 408.

Now turning to FIG. 6, a schematic of the bogie positioning system 600 is shown. Work machines 100 often have a plurality of sensors 610 that sense a variety of different variables such as machine operating parameters, work site characteristics, environmental parameters, etc. In the exemplary embodiment shown, input signals 630 are communicated over a controller area network (CAN) bus 617 (or another network, such as an Ethernet network, WIFI, etc.) to various systems on the machine such as the control unit 615 that process the sensed variable to generate output signals (such as command signals 620 or other outputs) based on the sensed variables. Work machines 100 may also have a wide variety of controllable subsystems 635 that can perform various operations, including setting bogie assembly control to either active control 622 or passive control 624. These controllable subsystems 635 are actuated by receiving input signals 630 communicated over the CAN bus 617. These input signals 630 may be user-input signals 637 which originate from the user input interface 255 on the work machine 100, a conditional response based on the controllable subsystems 635 set to a specific mode, and/or the trigger of an input signal 630 to the CAN bus 617 from the plurality of sensors 610.

With continued reference to FIGS. 1 through 6, the control unit 615 may be in communication with, or communicatively coupled to, the bogie assemblies (205, 210), a user input interface 603, controllable subsystems 635, and a plurality of sensors 610 on the work machine 100. The control unit 615 may generate command signals 620 to the at least one actuator 250 (e.g. a hydraulic cylinder) based on input signals 630 from either the user input interface 603 or the plurality of sensors 610 to selectively engage at least one of the front wheel 215 and the rear wheel 220 from the bogie assemblies (205, 210) to the ground surface 420. Selective engagement may be defined as engagement of the wheel with ground surface 420, or a partial engagement of the wheel with the ground surface 420. That is by controlling the vertical displacement 412 of the wheel relative to the chassis 225, the degrees with which the ground engaging surfaces 425 of the wheel engage the ground surface 420 will vary (i.e. the relative traction) and the downward pressure 430 on the wheel from the weight of the chassis 225 may also be manipulated.

In one instance, the control unit 615 may comprise of (or be communicatively coupled to) a speed module 640. The speed module 640 may be configured to receive a speed input signal 645 based on either the work machine speed, a gear selection wherein the gear selection is associated with the work machine speed, or both. Work machine speed may be derived from a plurality of sensors 610 such as a ground sensor, an accelerometer, etc. The speed module 640 may then transmit a command signal 620 to vertically position a first wheel (315a or 320a) of the right bogie assembly 210 and a corresponding second wheel (315b or 320b) of the left bogie assembly 205 based on the speed input signals 645. For example, at low speeds over rough terrain, the work machine 100 may engage all wheels. However, at higher speeds, e.g. when moving over paved roads during transport of the work machine 100 to a worksite, the work machine 100 may engage only two of the four wheels to reduce traction. Often, the two of the four wheels will be corresponding to one another on each respective bogie assembly (e.g. 215a and 215b, or 220a and 220b).

The control unit 615 may further comprise an object detection module 650. The object detection module 650 may receive an object detection input signal 655 based on detection of an object in a path of travel 262 (shown in FIG. 2) of the work machine 100 from the plurality of sensors 610. The object detection module 650 may transmit a command signal 620 in response to the objection detection input signal 655 to raise a front wheel 215 or a rear wheel 220 closest to the direction of travel in anticipation of the object, and the subsequent wheel in the direction of travel in anticipation of the object, thereby advantageously minimizing and/or avoid impact damage to the work machine 100 from a wheel hitting the object. When in the active control status 622, if a wheel anticipates passing over a bump in the forward direction, the beam may rotate counter-clockwise to vertically displace the front wheel (215a or 215b) upwards. The beam may subsequently turn clockwise upon passing over the object to vertically displace a rear wheel (220a or 220b) upwards. This action dampens the tipping of the work machine and movement of the center of gravity of the chassis. Detection of an object in a path of travel 262 may include the plurality or sensors 610, strategically placed cameras, lidar, radar, to name a few.

Figure 7A:
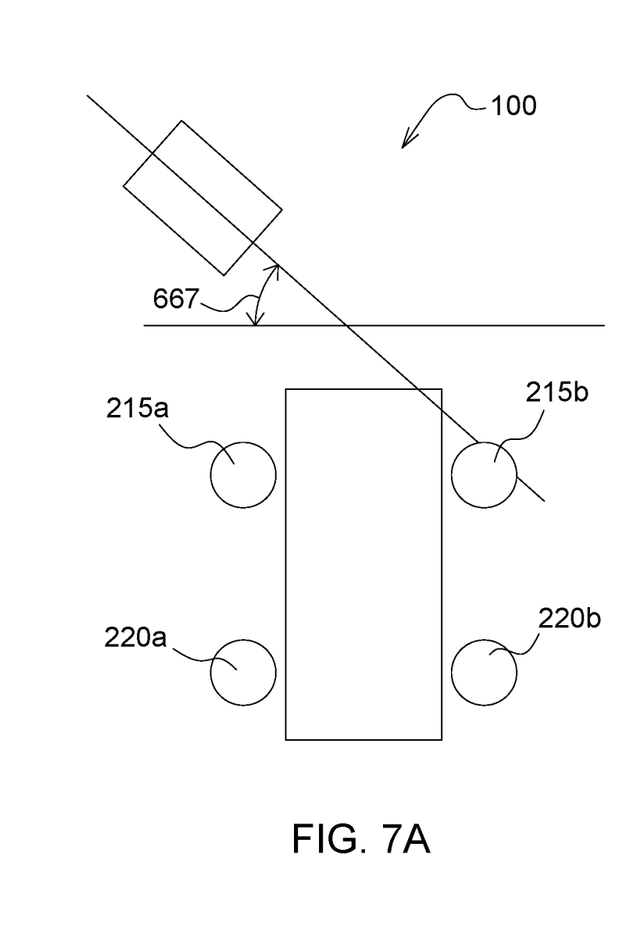
FIG. 7A is simplified schematic of a work machine turning.
Figure 7B:
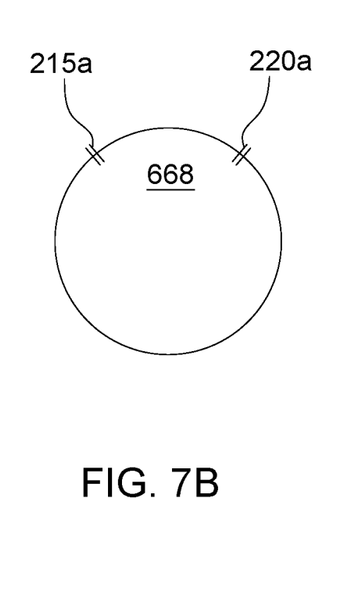
FIG. 7B is a simplified schematic of work machine demonstrating the impact on turning radius for a shorter wheelbase.
Figure 7C:
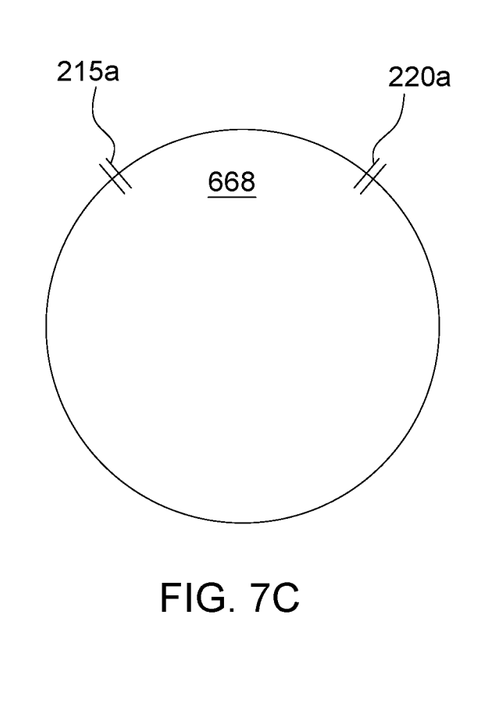
FIG. 7C is a simplified schematic demonstrating the impact on turning radius for a longer wheelbase.

Furthermore, the control unit 615 may also comprise an articulation angle module 660. The articulation angle module 660 may receive an articulation angle input signal 665 representing the articulation angle 667 (shown in FIG. 7A) of the work machine 100 from the plurality of sensors 610. The articulation angle module 660 may determine when the articulation angle 667 is greater than a predetermined angle. The articulation angle module 660 may transmit a command signal 620 in response to the articulation input signal 370 to disengage the rear wheel with the ground surface 420 upon reaching the predetermined angle, thereby shortening the wheel base of the work machine. More particularly, the command signal 620 may initiate disengagement of the rear wheel 220*a* inner to the direction of turn of the work machine 100. FIG. 7A demonstrates a simplified schematic of a work machine 100 turning, wherein articulation angle 667 (at hitch for this embodiment) and wheel (220*a*) that may be vertically displaced above the ground surface using the bogie to reduce the wheel base, thereby reducing scrubbing. FIG. 7B demonstrates the impact on turning radius 668 (as seen by circle) for a shortened wheelbase. The two-line marks on circle are representative of the spacing of the two wheels (e.g. 215*a* and 220*a*) in the direction of turn. Alternatively, FIG. 7C demonstrates the impact on turning radius 668 (as seen by circle for a longer wheelbase). Vertically raising a wheel off the ground surface 420 for articulation angles 667 greater than a predetermined angle (in this exemplary embodiment the articulation angle 667 is at the hitch) advantageously additionally reduces tire wear and allows the operator to make tighter turns with ease.

Figure 8:
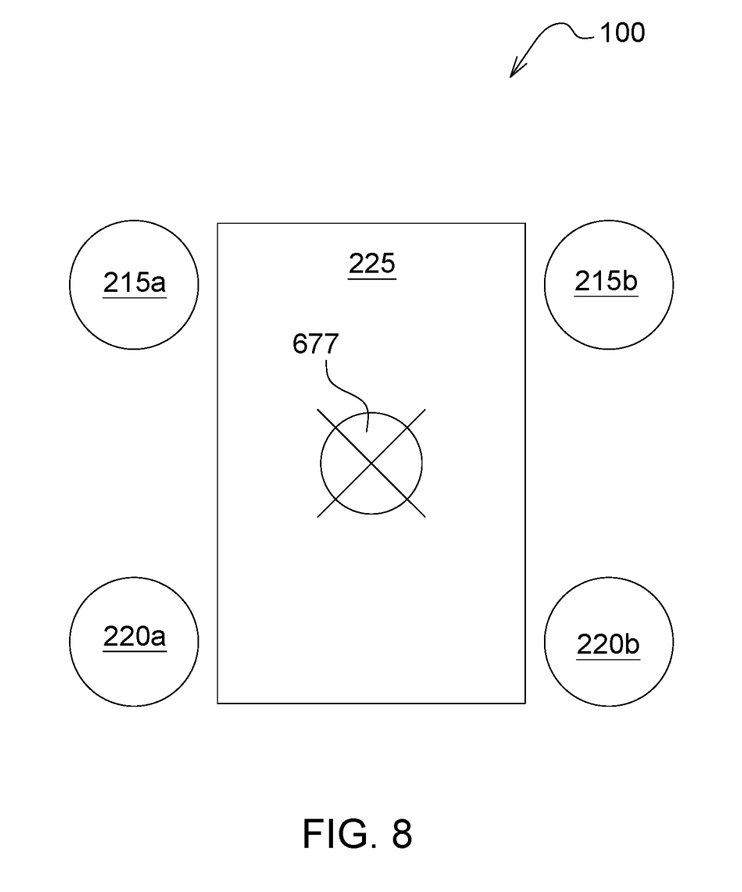
FIG. 8 is a simplified schematic of a work machine demonstrating the center of mass for use with the tire pressure module and the differential slip module.

Now also referring to FIG. 8, the control unit 615 may further comprise a tire pressure module 670. The tire pressure module 670 may receive a tire input signal 675 representing a tire pressure of each respective wheel (215*a*, 215*b*, 220*a*, 220*b*) from the plurality of sensors 610. The tire pressure module 670 may transmit a command signal 620 in response to the tire pressure input signal 675 to shift a center of mass 677 of the chassis 225 by vertically displacing at least one of the front wheel (215*a*, 215*b*) and the rear wheel (220*a*, 220*b*).

The control unit 615 may further comprise a differential slip module 680. The differential slip module 680 may generate a traction input signal 685 from each respective wheel (215*a*, 215*b*, 220*a*, 220*b*) from a plurality of sensors 610. The differential slip module may transmit a command signal 620 in response to the traction input signal 685 to equalize the torque load on a propulsion system by vertically displacing at least one of the front wheel (215*a*, 215*b*) and the rear wheel (220*a*, 220*b*). The vertical displacement may not require disengagement of the wheel with the ground surface. Rather, the vertical displacement in an upwards direction may relieve pressure off a first wheel while a second wheel may be vertically displaced downwards in an equal and opposite direction to increase pressure on the second wheel, thereby increasing the second wheel's traction and decreasing the first wheel's traction.

Figure 9:
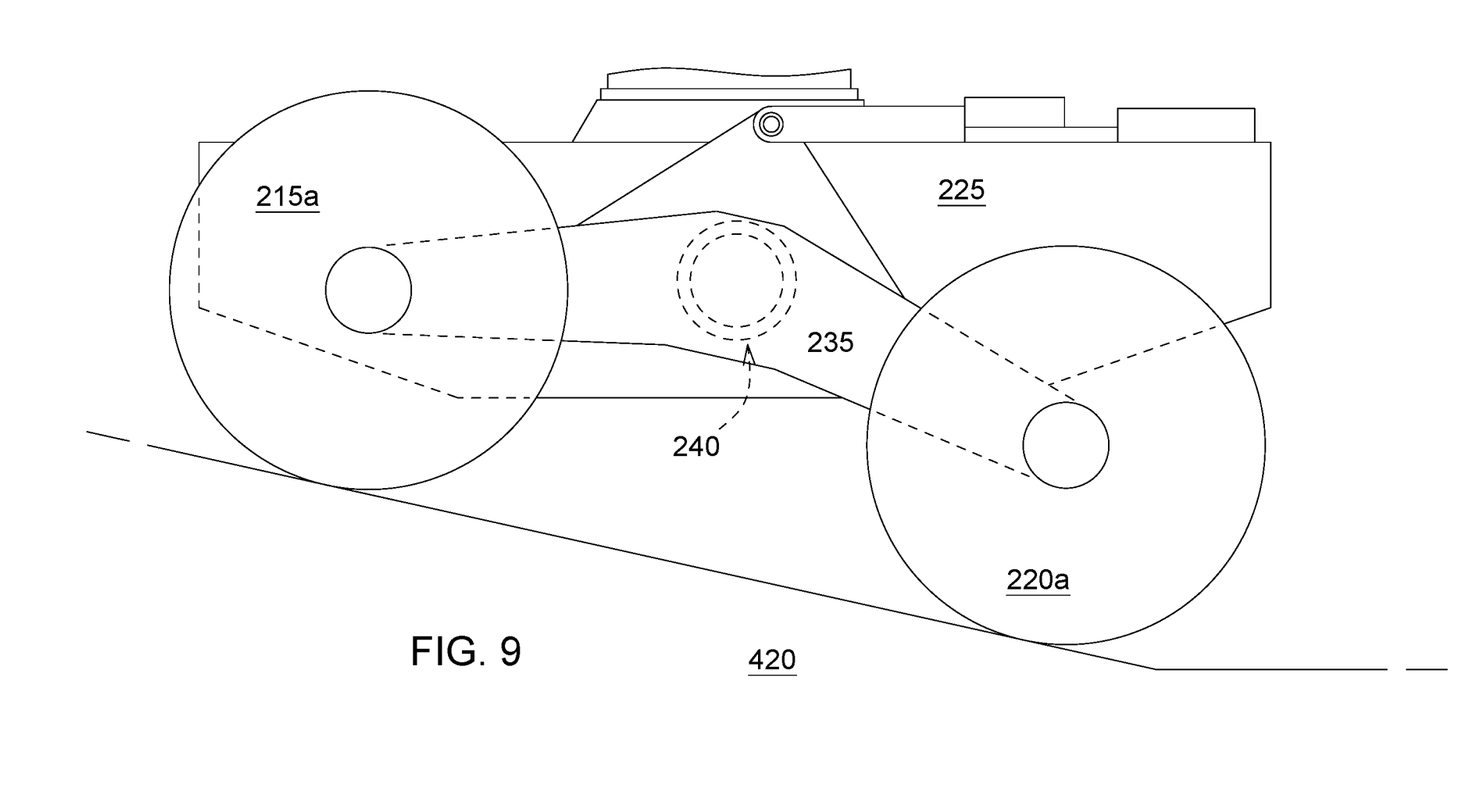
FIG. 9 is a simplified schematic demonstrating the use of a bogie on a work machine on an incline.

The control unit 615 may further comprise an inclination module. The inclination module 690 may generate an inclination angle input signal 695 representing one or more of a roll and a pitch of the chassis 225 from the plurality of sensors 610. The inclination angle module may transmit a command signal in response to the inclination angle input signal 695 to shift a center of mass 677 of the chassis 225 by vertically displacing at least one of the front wheel (215*a*, 215*b*) and the rear wheel (220*a*, 220*b*). As shown in FIG. 9 for example, when the work machine is climbing or operating on a slope, the longitudinal axis of the chassis 225 may be aligned in the direction of the slope. A vertical displacement of the rear wheels (220*a*, 220*b*) upwards through the bogie assemblies (205, 210) will cause the chassis 225 to assume the angle illustrated, thereby leveling the chassis 225.

The control unit 615 may further comprise a ride control module 700. The ride control module 700 may generate a ride control input signal 705 representing a load position of the implement 115, relative to the chassis 225, from the plurality of sensors 610. Plurality of sensors 610 for this application may include position and/or load sensors for the actuators 250 from the boom assembly 110. The ride control module 700 may transmit a command signal 620 in response to the ride control input signal 705 to shift a center of mass 677 of the chassis 225 by vertically displacing at least one of the front wheel (215*a*, 215*b*) or the rear wheel (220*a*, 220*b*). Work machines often hold a significant load at the end of their boom assembly 110. Such load shifts the center of mass 677 of the work machine 100, thereby reducing the feel of a "smooth ride". This may result in a bumpy ride where the inertia of the implement 115 with load imparts swaying. Such swaying can place uneven pressure on wheels (215*a*, 215*b*, 220*a*, 220*b*), thereby reducing traction in some portions of the work machine 100. Therein vertically displacing at least one of the front wheel (215*a*, 215*b*) or the rear wheel (220*a*, 220*b*) may counter loss of traction introduced by the relative position of load on the implement 115 relative to the chassis 225.

In some instances, the operator may provide input through the user input interface 255 to actively command the relative positioning of the front wheel (215*a*, 215*b*) relative to the rear wheel (220*a*, 220*b*). In one exemplary operation, the user input interface 255 may comprise of a roading mode switch 710, wherein activating the roading mode switch 710 generates a roading mode input signal 715. The control unit 615 may transmit a command signal 620 in response to the roading mode input signal 715 to vertically raise a front wheel 215*a* or rear wheel 220*a* of a left bogie assembly 205 and a corresponding front wheel 215*b* or rear wheel 220*b* of the right bogie assembly 210 to at least partially disengage the ground surface 420. Work machines are generally used off road, functioning in bumping terrain at relatively slow speeds. When transported from a first work site to a second work site, it may be desirable to disengage two of the wheels from the ground surface to reduce traction, thereby allowing the work machine to travel with increased fuel efficiency and less drag. Manipulating the bogie to vertically displace two wheels upwards using the roading mode switch 710 provides this efficiency.

In another instance, wherein the operator may actively control the bogie positioning system 600 through the user input interface 255 that includes repair mode switch 720. The user input interface 255 may comprise a repair mode switch 720 corresponding to a repair mode of the work machine 100, wherein activating the repair mode generates a repair mode input signal 725. The control unit 615 may transmit a command signal 620 in response to the repair mode input signal 725 to raise at least one of the front wheel (215*a*, 215*b*) and the rear wheel (220*a*, 220*b*) to disengage the ground surface 420. In one exemplary scenario, a flat tire or a tire in need of change may cause the operator to place the designated tire in repair mode, thereby actuating the vertical displacement of the designated tire for ease of access and removal.

Figure 10:
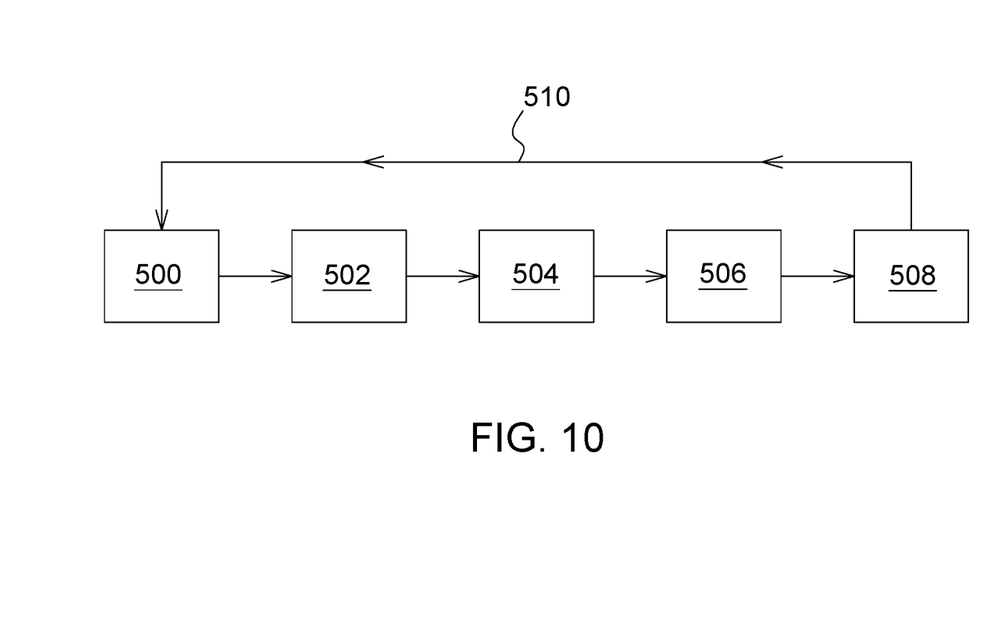
FIG. 10 is simplified schematic representing the method of selectively engaging at least one wheel of a bogie assembly of a work machine to a ground surface.

Now referring to FIG. 10 with continued reference to FIGS. 1-9, FIG. 10 illustrates a method of selectively engaging at least one wheel of a bogie assembly (205, 210)

of a work machine 100 to a ground surface 420. At step 500, the method starts with receiving input signals 630 by a control unit 615 on the work machine 100 from at least one of user input interface 603 located on the work machine 100, and a plurality of sensors 610 located on the work machine 100.

At step 502, the control unit 615 determines a condition based on the input signals 630. Through one of several modules discussed above and shown in FIG. 6, the control unit may recognize a need to actively respond in selective engagement of a first or a second wheel to achieve a desired result for improved control, improved fuel efficiency, and a reduction on wear of the components. Alternatively, the control unit may impact controllable subsystems based on the input signals 630 from the plurality of sensors 610 and the user input interface 603. Through a real-time feedback loop mechanism 510 a parameter of the work machine may be monitored. If the parameter continues to fall outside an optimized range, the work machine will determine a condition has been met, and will continue with the next step in the method.

At step 504, the control unit 615 programs a command signal 620 based on the condition.

At step 506, the control unit 615 transmits the command signal 620 to at least one actuator 250 of the bogie assembly (205, 210).

At step 508, the at least one actuator 250 of the bogie assembly (205, 210) is actuated, wherein actuation of the at least one actuator positions at least one of the front wheel (215a, 215b) and the rear wheel (220a, 220b) at a predetermined vertical displacement 412 relative to the chassis 225.

After step 508, actuation of the at least one actuator 250 of the bogie assembly has occurred, according to one embodiment. These steps may be repeated wherein the bogie assembly consistently adjusts the vertical displacement of each respective wheel relative to the horizontal of the chassis based on the individual input signal 630 from the modules in control unit 615 discussed above, or the cumulative or net effect of input signal 630 from the modules. In other embodiments, one or more of these steps or operations may be omitted, repeated, or re-ordered and still achieve the desired results.

The terminology used herein is for describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

While the above describes example embodiments of the present disclosure, these descriptions should not be viewed in a restrictive or limiting sense. Rather, there are several variations and modifications which may be made without departing from the scope of the appended claims.

What is claimed is:

1. A bogie positioning system for a work machine, the bogie positioning system adapted to selectively engage a wheel of a work machine to a ground surface, the system comprising:
   a left bogie assembly and a right bogie assembly;
   each respective bogie assembly having a front wheel of the work machine coupled to a rear wheel of the work machine through a bogie coupling mechanism, the bogie coupling mechanism comprising a beam with a rotary joint, the rotary joint allowing the front wheel to rotate about a rotary axis relative to the rear wheel, the beam coupled to a chassis of the work machine, at least one actuator coupled to the beam, the at least one actuator rotating the beam about the rotary axis wherein actuation of the at least one actuator positions the front wheel and the rear wheel at a predetermined vertical displacement relative to the chassis;
   a control unit in communication with the bogie assemblies, a user input interface, and a plurality of sensors, the control unit generating command signals to actuate the at least one actuator based on input signals from the user input interface and the plurality of sensors, thereby selectively engaging the front wheel and the rear wheel of the work machine to the ground surface.

2. The bogie positioning system of claim 1, wherein the control unit comprises a speed module, the speed module configured to receive a speed input signal based on at least one of a work machine speed and a gear selection, the gear selection associated with the work machine speed, the speed module transmitting a command signal to vertically position a first wheel of the right bogie assembly and a corresponding second wheel of the left bogie assembly based on the speed input signals.

3. The bogie positioning system of claim 1, wherein the user input interface comprises a roading mode switch, wherein activating the roading mode switch generates a roading mode input signal, the control unit transmitting a command signal in response to the roading mode input signal to vertically raise a front wheel or rear wheel of the right bogie assembly and a corresponding front wheel or rear wheel of the left bogie assembly to at least partially disengage the ground surface.

4. The bogie positioning system of claim 1, wherein the control unit comprise an object detection module, the object detection module receiving an object detection input signal based on detection of an object in a path of travel of the work the work machine from the plurality of sensors, the object detection module transmitting a command signal in response to the objection detection input signal to raise a front wheel or a rear wheel closest to the direction of travel.

5. The bogie positioning system of claim 1, wherein the user input interface comprises a repair mode switch corresponding to a repair mode of the work machine, wherein activating the repair mode generates a repair mode input signal, the control unit transmitting a command signal in response to the repair mode input signal to automatically raise at least one of the front wheel and the rear wheel to disengage the ground surface.

6. The bogie positioning system of claim 1, wherein the control unit comprises an articulation angle module, the articulation angle module receiving an articulation angle input signal representing the articulation angle at a hitch from the plurality of sensors, the articulation angle module determining when the articulation angle is greater than a predetermined angle, the articulation angle transmitting a command signal in response to the articulation input signal to disengage the rear wheel with the ground surface.

7. The bogie positioning system of claim 1, wherein the control unit comprises a tire pressure module, the tire pressure module receiving a tire input signal representing a tire pressure of each respective wheel from the plurality of sensors, the tire pressure module transmitting a command signal in response to the tire pressure input signal to shift a center of mass of the chassis by vertically displacing at least one of the front wheel and the rear wheel.

8. The bogie positioning system of claim 1, wherein the control unit comprises an inclination module, the inclination module generating an inclination angle input signal representing one or more of a roll and a pitch of the chassis from the plurality of sensors, the inclination angle module transmitting a command signal in response to the inclination angle input signal to shift a center of mass of the chassis by vertically displacing at least one of the front wheel and the rear wheel.

9. The bogie positioning system of claim 1, wherein the control unit comprises a ride control module, the ride control module receiving a ride control input signal representing a load position of an implement from the plurality of sensors, the ride control module transmitting a command signal in response to the ride control input signal to shift a center of mass of the chassis by vertically displacing at least one of the front wheel or the rear wheel.

10. The bogie positioning system of claim 1, wherein the control unit comprises a differential slip module, the differential slip module receiving a traction input signal from each respective wheel from the plurality of sensors, the differential slip module transmitting a command signal in response to the traction input signal to equalize the torque load on a propulsion system by vertically displacing at least one of the front wheel and the rear wheel.

11. A method of selectively engaging at least one wheel of a bogie assembly of a work machine to a ground surface, the bogie assembly comprising a left bogie assembly and a right bogie assembly, each respective bogie assembly having a front wheel of the work machine coupled to a rear wheel of the work machine through a bogie coupling mechanism, the bogie coupling mechanism comprising a beam with a rotary joint, the rotary joint allowing the front wheel to rotate about a rotary axis relative to the rear wheel, the beam coupled to a chassis of the work machine, at least one actuator coupled to the beam, the method comprising:
  receiving input signals by a control unit on the work machine from a user input interface located on the work machine and a plurality of sensors located on the work machine;
  determining a condition by the control unit based on the input signals;
  programming a command signal based on the condition;
  transmitting the command signal to the at least one actuator of the bogie assembly; and
  actuating the at least one actuator of the bogie assembly, wherein actuation of the at least one actuator positions the front wheel and the rear wheel at a predetermined vertical displacement relative to the chassis.

12. The method of claim 11, wherein the control unit comprises a speed module, the speed module configured to determine a speed input based on at least one of a work machine speed and a gear selection, the gear selection associated with the work machine speed.

13. The method of claim 11, wherein the user input interface comprises a roading mode switch, wherein activating the roading mode switch generates a roading mode input signal received by the control unit, the control unit transmitting a command signal in response to the roading mode input signal to vertically raise a front wheel or rear wheel of the right bogie assembly and a corresponding front wheel or rear wheel of the left bogie assembly to at least partially disengage the ground surface.

14. The method of claim 11, wherein the control unit comprise an object detection module, the object detection module generating an object detection input signal based on detection of an object in a path of travel of the work the work machine from the plurality of sensors, the object detection module transmitting a command signal in response to the objection detection input signal to raise a front wheel or a rear wheel closest to the direction of travel.

15. The method of claim 11, wherein the user input interface comprises a repair mode switch corresponding to a repair mode of the work machine, wherein activating the repair mode generates a repair mode input signal received by the control unit wherein actuation of the at least one actuator positions automatically.

16. The method of claim 11, wherein the control unit comprises an articulation angle module, the articulation angle module receiving an articulation angle input signal representing the articulation angle at a hitch from the plurality of sensors, the articulation angle module determining when the articulation angle is greater than a predetermined angle.

17. The method of claim 11, wherein the control unit comprises a tire pressure module, the tire pressure module generating a tire input signal representing a tire pressure of each respective wheel from the plurality of sensors, the tire pressure module transmitting a command signal in response to the tire pressure input signal to shift a center of mass of the chassis by vertically displacing at least one of the front wheel and the rear wheel.

18. The method of claim 11 wherein the control unit comprises an inclination module, the inclination module generating an inclination angle input signal representing one or more of a roll and a pitch of the chassis from the plurality of sensors, the inclination angle module transmitting a command signal in response to the inclination angle input signal to shift a center of mass of the chassis by vertically displacing at least one of the front wheel and the rear wheel.

19. The method of claim 11, wherein the control unit comprises a ride control module, the ride control module generating a ride control input signal representing a load position of an implement from the plurality of sensors, the ride control module transmitting a command signal in response to the ride control input signal to shift a center of mass of the chassis by vertically displacing at least one of the front wheel or the rear wheel.

20. The method of claim 11, wherein the control unit comprises a differential slip module, the differential slip module generating a traction input signal from each respective wheel from the plurality of sensors, the differential slip module transmitting a command signal in response to the traction input signal to equalize the torque load on a propulsion system by vertically displacing at least one of the front wheel and the rear wheel.

* * * * *